United States Patent
Horng et al.

(10) Patent No.: US 8,421,383 B2
(45) Date of Patent: Apr. 16, 2013

(54) ROTATION CONTROL CIRCUIT OF FAN

(75) Inventors: Alex Horng, Kaohsiung (TW);
Chi-Hung Kuo, Kaohsiung (TW);
Chung-Ken Cheng, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 530 days.

(21) Appl. No.: 12/723,830

(22) Filed: Mar. 15, 2010

(65) Prior Publication Data
US 2011/0221364 A1 Sep. 15, 2011

(51) Int. Cl.
*H02P 1/00* (2006.01)
(52) U.S. Cl.
USPC ............ 318/280; 318/268; 318/285; 318/507
(58) Field of Classification Search .................. 318/256, 318/257, 268, 280, 283, 285, 507
See application file for complete search history.

(56) References Cited

U.S. PATENT DOCUMENTS

| | | | | | |
|---|---|---|---|---|---|
| 3,935,522 | A | * | 1/1976 | Tsay | 388/830 |
| 4,413,211 | A | * | 11/1983 | Fowler | 318/257 |
| 4,555,654 | A | * | 11/1985 | Spradling et al. | 318/751 |
| 4,777,415 | A | | 10/1988 | Morizot | |
| 5,321,344 | A | * | 6/1994 | Ott et al. | 318/280 |
| 6,211,635 | B1 | * | 4/2001 | Kambe et al. | 318/400.11 |
| 6,998,803 | B2 | * | 2/2006 | Durkee et al. | 318/281 |
| 7,242,857 | B2 | * | 7/2007 | Wu et al. | 318/400.2 |
| 7,598,691 | B2 | * | 10/2009 | Kuo et al. | 318/434 |
| 7,646,163 | B2 | | 1/2010 | Xi et al. | |
| 8,049,450 | B2 | * | 11/2011 | Wei | 318/434 |

* cited by examiner

*Primary Examiner* — Walter Benson
*Assistant Examiner* — Thai Dinh
(74) *Attorney, Agent, or Firm* — Muncy, Geissler, Olds & Lowe, PLLC (57) ABSTRACT

A rotation control circuit comprises a motor-driving unit and a rotation-switching unit. The motor-driving unit is coupled to a motor of a fan. The rotation-switching unit is coupled to the motor-driving unit and has at least a charging-discharging circuit for generating a rotation control command, the rotation control command controls the motor to rotate in a forward direction for a time period when the motor starts to operate, and controls the motor to rotate in a backward direction opposite to the forward direction.

19 Claims, 6 Drawing Sheets

ROTATION CONTROL CIRCUIT OF FAN

BACKGROUND OF THE INVENTION

1. Field of the Invention

The present invention generally relates to a rotation control circuit of a fan and, more particularly, to a rotation control circuit of a fan that is capable of controlling a forward/backward rotation of the fan.

2. Description of the Related Art

Cooling fans are often equipped in electronic devices for heat dissipation. During the operation of a cooling fan, the cooling fan rotates in a cooling direction (clockwise or counterclockwise) to draw the external cool air into the electronic devices for heat exchange. However, the dust contained in the air may remain inside the electronic devices during the heat exchange. To clean the dust, at the moment the electronic devices are powered-on, the cooling fan would rotate in a dust dispelling direction (clockwise or counterclockwise) opposite to the cooling direction for a time period (such as 5 sec) in order to exhaust the accumulated dust from the electronic devices. After the dust exhaustion is finished, the cooling fan rotates in the cooling direction for heat dissipation of the electronic devices.

Figure 1:
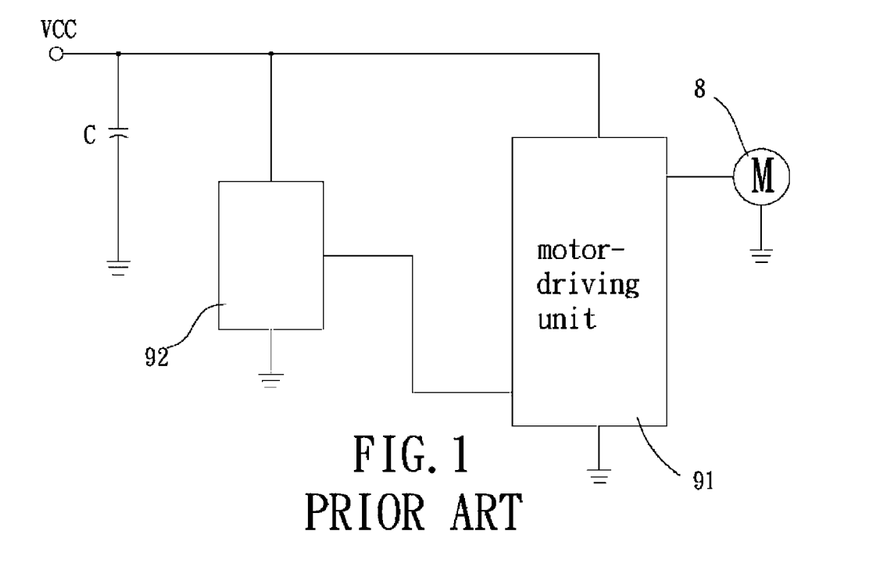
FIG. 1 shows a block diagram of a traditional rotation control circuit.

FIG. 1 shows a traditional rotation control circuit that controls forward and backward rotations of a fan for dust exhaustion and heat dissipation. The rotation control circuit comprises a motor-driving unit 91 and a micro controller 92 connected to a power supply Vcc. The motor-driving unit 91 is electrically connected to the micro controller 92 and a motor 8.

At the moment the fan begins to operate, the micro controller 92 sends a forward rotation control signal to the motor-driving unit 91 so that the motor-driving unit 91 may control the motor 8 to rotate in the dust dispelling direction for dust exhaustion.

After the time period where the dust exhaustion has been performed, the micro controller 92 sends a backward rotation control signal to the motor-driving unit 91 so that the motor-driving unit 91 may control the motor 8 to rotate in the cooling direction for heat dissipation.

Generally, the traditional rotation control circuit of the fan has a cost disadvantage as it requires the utilization of the expensive micro controller 92 for generating the forward and backward rotation control signals. Therefore, a need for cost reduction exists.

SUMMARY OF THE INVENTION

It is therefore the primary objective of this invention to provide a rotation control circuit of a fan that consists of only a few analog components without the utilization of a micro controller, thereby reducing the cost.

The invention discloses a rotation control circuit comprises a motor-driving unit and a rotation-switching unit. The motor-driving unit is coupled to a motor of a fan. The rotation-switching unit is coupled to the motor-driving unit and has at least a charging-discharging circuit for generating a rotation control command, the rotation control command controls the motor to rotate in a forward direction for a time period when the motor starts to operate, and controls the motor to rotate in a backward direction opposite to the forward direction.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
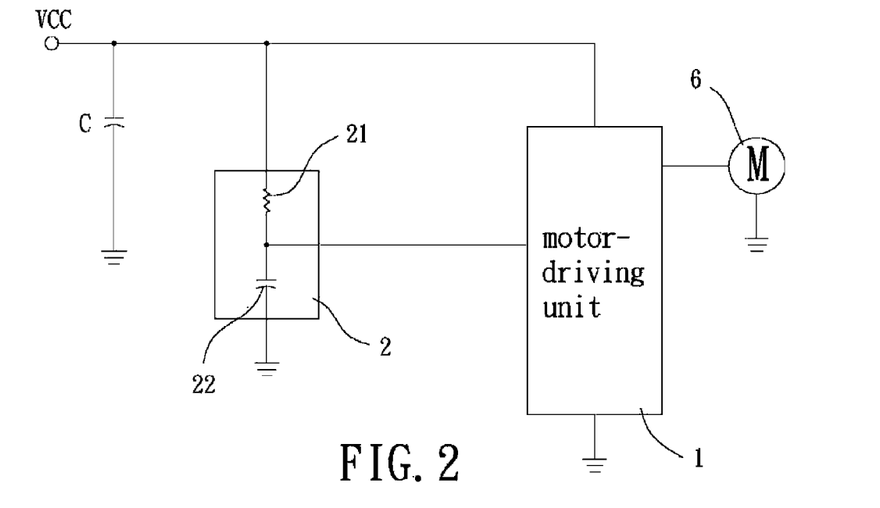
FIG. 2 shows a rotation control circuit of a fan according to a first embodiment of the invention.

FIG. 2 shows a rotation control circuit of a fan according to a first embodiment of the invention. The rotation control circuit comprises a motor-driving unit 1 and a rotation-switching unit 2 connected to a power supply Vcc. The motor-driving unit 1 is electrically connected to a motor 6. The rotation-switching unit 2 may be a charging-discharging circuit consisting of a plurality of analog components. The rotation-switching unit 2 is electrically connected to the motor-driving unit 1. The rotation control circuit further comprises a storage capacitor C for storing electricity energy. Based on this, at the moment the power supply Vcc is terminated, the storage capacitor C may provide the electricity energy required for maintaining the operation of the fan. The rotation-switching unit 2 may generate a rotation control command that is provided to the motor-driving unit 1. The rotation control command consists of forward and backward rotation control signals, with the forward rotation control signal preceding the backward rotation control signal. Based on the rotation control command, the motor-driving unit 1 may control the motor 6 to rotate in a forward direction (clockwise or counterclockwise) for a time period according to the forward rotation control signal, and then to rotate in a backward direction (clockwise or counterclockwise) opposite to the forward direction according to the backward rotation control signal. Wherein, the forward direction serves as the dust dispelling direction for dust exhaustion, whereas the backward direction serves as the cooling direction for heat dissipation.

Please refer to FIG. 2 again, specifically, the motor-driving unit 1 may generate a logic-low signal and a logic-high signal based on the receipt of the forward and backward rotation control signals. The rotation-switching unit 2 keeps generating the forward rotation control signal during the time period and then switches to generate the backward rotation control signal after the time period. In this way, motor-driving unit 1 can control the motor 6 to rotate in the forward direction for the time period and then to rotate in the backward direction opposite to the forward direction after the time period.

Please refer to FIG. 2, the rotation-switching unit 2 of the first embodiment comprises a resistor 21 and a capacitor 22, with the resistor 21 and the capacitor 22 forming the charging-discharging circuit. The node where the resistor 21 and the capacitor 22 are connected serves as an output end that is electrically connected to the motor-driving unit 1, wherein the capacitor 22 is connected to the motor-driving unit 1 in parallel.

Figure 3A:
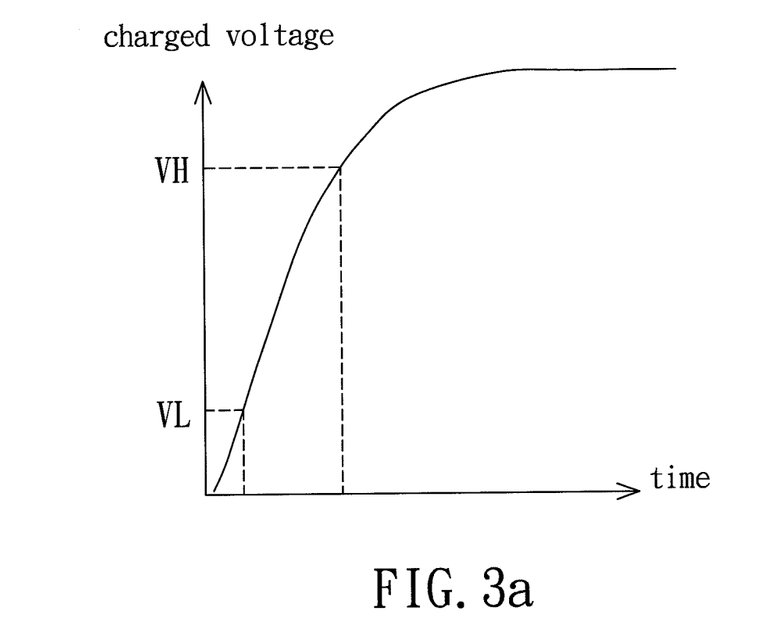
FIG. 3a shows a charging characteristic of a capacitor.
Figure 3B:
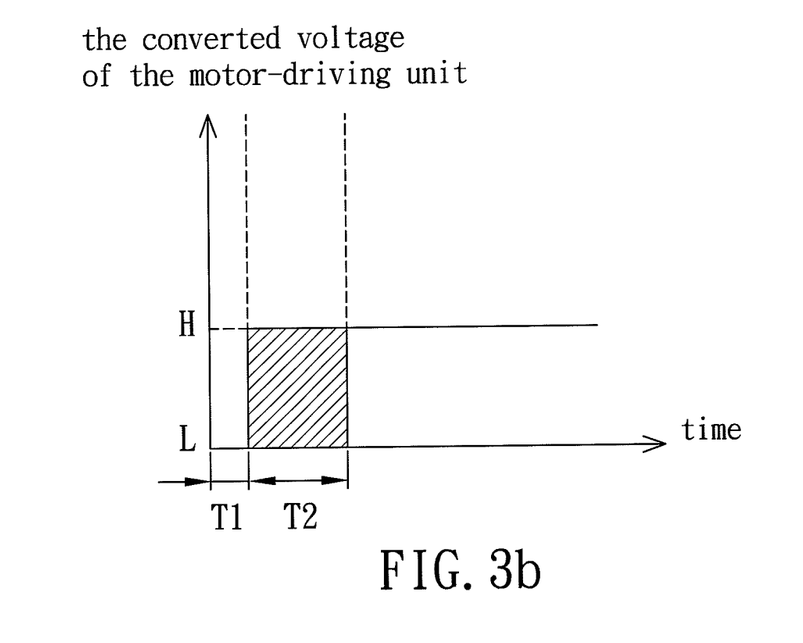
FIG. 3b shows a voltage conversion diagram of a motor-driving unit based on low threshold value and high threshold value.

Please refer to FIGS. 2, 3a and 3b, the capacitor 22 is charged by the power supply Vcc when the fan is powered-on, in which the FIG. 3a showing a charging characteristics of the capacitor 22. The charged voltage of the capacitor 22 may serve as the rotation control command to be received by the motor-driving unit 1.

More specifically, please also refer to FIG. 3b, the motor-driving unit 1 converts the received charged voltage of the capacitor 22 into logic-low and logic-high signals based on low threshold value VL (such as 1V) and high threshold value VH (such as 4V). For example, the portion of the received charged voltage lower than the low threshold value VL would be converted into the logic-low signal. Similarly, the portion of the received charged voltage higher than the high threshold value VH will be converted into the logic-high signal.

In other words, during a time period T1 where the capacitor 22 is charged from 0V to the low threshold value VL, the received charged voltage is regarded as the forward rotation control signal by the motor-driving unit 1. Therefore, the motor-driving unit 1 controls the motor 6 to rotate in the forward direction for the time period T1 according to the forward rotation control signal. Similarly, after the charged voltage of the capacitor 22 is higher than the high threshold value VH, the received charged voltage is regarded as the backward rotation control signal by the motor-driving unit 1. Therefore, the motor-driving unit 1 controls the motor 6 to rotate in the backward direction opposite to the forward direction according to the backward rotation control signal. The length of the time period T1 may be adjusted by properly designing the value of the resistor 21 and the capacitor 22.

It is noted that during a time period T2 where the capacitor 22 is charged from the low threshold value VL to the high threshold value VH, the motor 6 no longer operates since the received charged voltage during the time period T2 is indeterminable for the motor-driving unit 1.

When the power supply Vcc is terminated, the capacitor 22 may provide electricity energy to the motor-driving unit 1 and the rotation-switching unit 2 for a short period. Afterwards, the capacitor 22 would discharge until no electricity energy is preserved therein. Based on this, the capacitor 22 may be re-charged from 0V to Vcc when the power supply Vcc is regained, allowing the dust exhaustion to be re-performed each time the power supply Vcc is regained.

Figure 4:
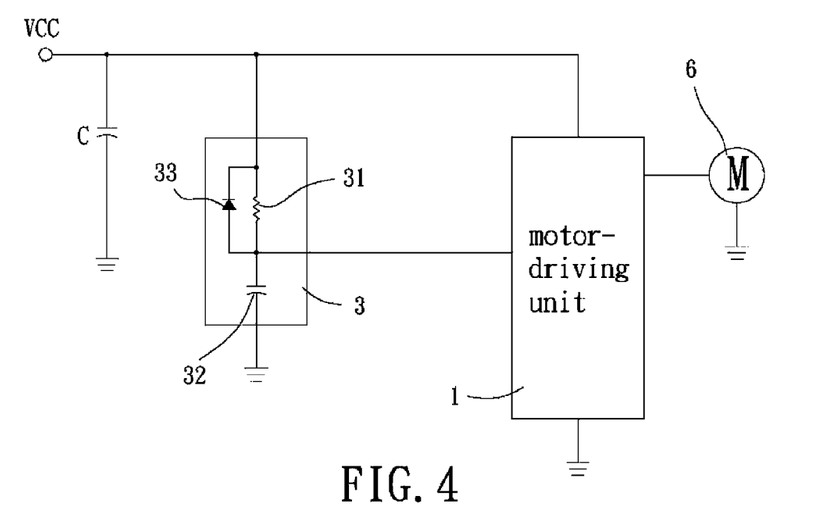
FIG. 4 shows a rotation control circuit of a fan according to a second embodiment of the invention.

FIG. 4 shows a rotation control circuit of a fan according to a second embodiment of the invention. In contrast to the first embodiment, a rotation-switching unit 3 in the second embodiment comprises a resistor 31, a capacitor 32 and a diode 33. The resistor 31 and the capacitor 32 form the charging-discharging circuit and the capacitor 32 is connected to the motor-driving unit 1 in parallel. The diode 33 and the resistor 31 are inversely connected in parallel; namely, an anode of the diode 33 is connected to an output end of the charging-discharging circuit.

Based on the circuit structure in FIG. 4, at the moment the power supply Vcc is terminated, the stored voltage of the capacitor 32 may be quickly discharged via a discharging path formed by the resistor 31 and the diode 33. In other words, it would take longer time for the capacitor 32 to discharge if the resistor 31 and the diode 33 were not used. Therefore, the second embodiment of the invention facilitates the operation of the fan by shortening the time period of discharging operation via the discharging path.

Figure 5:
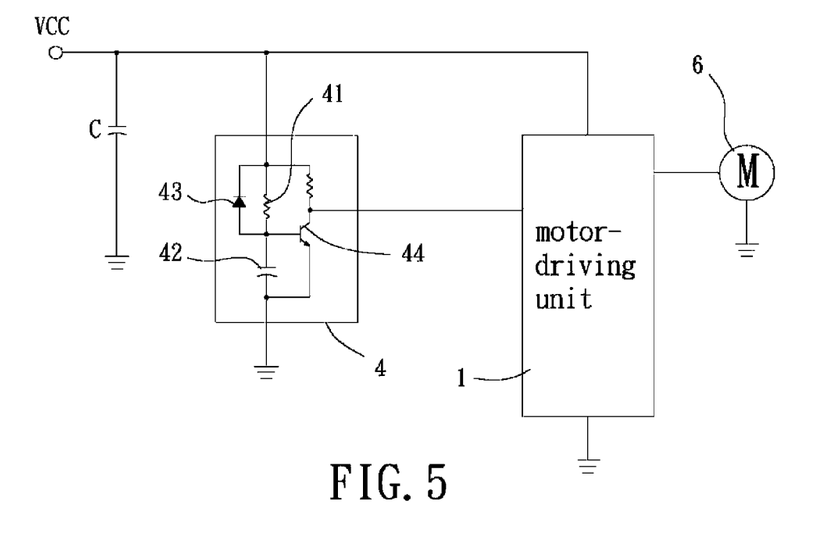
FIG. 5 shows a rotation control circuit of a fan according to a third embodiment of the invention.

FIG. 5 shows a rotation control circuit of a fan according to a third embodiment of the invention. In contrast to the second embodiment, a rotation-switching unit 4 in the third embodiment comprises a resistor 41, a capacitor 42, a diode 43 and a transistor switch 44. The function of the resistor 41, capacitor 42 and diode 43 are similar to the resistor 31, capacitor 32 and diode 33 in the second embodiment, so it's not described herein for brevity.

Please refer to FIG. 5 again; an input end of the transistor switch 44 is electrically connected to a node where the resistor 41 and the capacitor 42 are connected. In this way, the charged voltage of the capacitor 42 may control the switching operation of the transistor switch 44. In addition, the transistor switch 44 is electrically connected to the motor-driving unit 1 in parallel, i.e. an output end of the transistor switch 44 (a collector or emitter) is electrically connected to the motor-driving unit 1. The transistor switch 44 may be an N-type transistor, such as an NPN transistor or NMOS transistor.

More specifically, the transistor switch 44 is OFF if the charged voltage of the capacitor 42 does not reach a threshold level of the transistor switch 44, enabling the power supply Vcc to be received by the motor-driving unit 1. On the contrary, transistor switch 44 is ON if the charged voltage of the capacitor 42 is higher than the threshold level of the transistor switch 44, enabling the ground voltage to be received by the motor-driving unit 1.

Based on the above description, in contrast to the first and second embodiments, the transistor switch 44 in the third embodiment has only two operation statuses: ON or OFF. Therefore, the rotation-switching unit 4 may rapidly operate between the two operation statuses, thereby avoiding the operation suspension of the fan caused by an indeterminable voltage status and facilitating the operation of the fan.

Furthermore, the rotation-switching unit 4 of the third embodiment may be operated without the diode 43 so as to reduce the cost and simplify the circuitry complexity.

Figure 6:
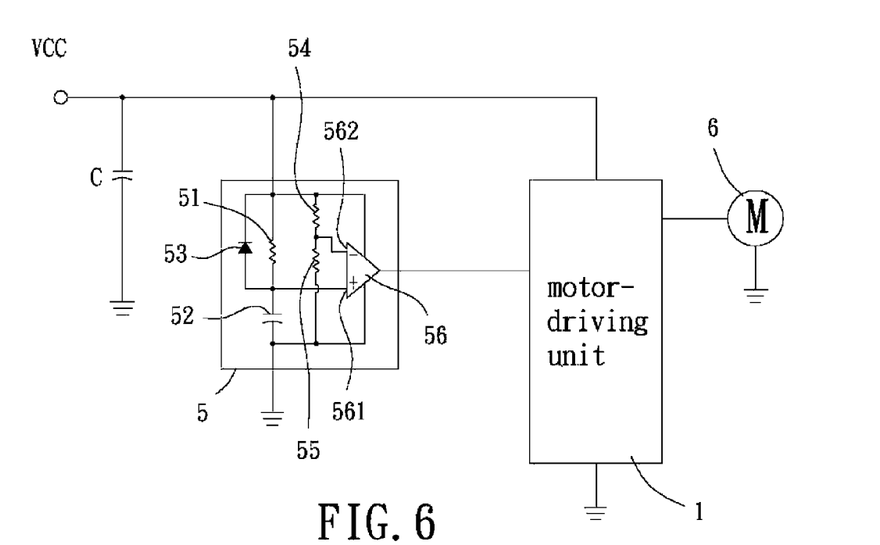
FIG. 6 shows a rotation control circuit of a fan according to a fourth embodiment of the invention.

FIG. 6 shows a rotation control circuit of a fan according to a fourth embodiment of the invention. In contrast to the third embodiment, a rotation-switching unit 5 in the fourth embodiment comprises a resistor 51, a capacitor 52, a diode 53, a first voltage-dividing resistor 54, a second voltage-dividing resistor 55 and a comparator 56. The function of the resistor 51, capacitor 52 and diode 53 are similar to the resistor 31, capacitor 32 and diode 33 in the second embodiment, so it's not described herein for brevity.

Please refer to FIG. 6; the first voltage-dividing resistor 54 is electrically connected to the second voltage-dividing resistor 55 in series so as to form a voltage-dividing network having an output end. The voltage-dividing network is connected between the power supply Vcc and a ground end so as to generate a reference voltage at the output end thereof. The reference voltage is across on the second voltage-dividing resistor 55.

The comparator 56 has a non-inverting input end 561, an inverting input end 562. A node where the resistor 51 and the capacitor 52 are connected is connected to the non-inverting input end 561 of the comparator 56. The output end of the voltage-dividing network is connected to the inverting input end 562 of the comparator 56. In this way, the stored voltage of the capacitor 52 may be compared with the reference voltage of the second voltage-dividing resistor 55 by the comparator 56 such that the comparator 56 may output a logic-low or logic-high signal. In other words, the comparator 56 outputs the logic-low signal when the stored voltage of the capacitor 52 is lower than the reference voltage. On the contrary, the comparator 56 outputs the logic-high signal when the stored voltage of the capacitor 52 is higher than the reference voltage. The comparator 56 has an output end electrically connected to the motor-driving unit 1.

The reference voltage of the voltage-dividing network may be adjusted by adjusting the value of the first voltage-dividing resistor 54 and/or the second voltage-dividing resistor 55. For example, assume that the power supply Vcc is 5V, the reference voltage would be set as 4V if the resistance ratio between the first voltage-dividing resistor 54 and the second voltage-dividing resistor 55 is 1 versus 4.

Furthermore, since the comparator 56 also only has two signal statuses: the logic-low and logic-high signals, in contrast to the rotation-switching unit 2 in the first and second embodiments, the fourth embodiment may avoid the operation suspension of the fan caused by the indeterminable voltage status.

In the fourth embodiment, the reference voltage may be adjusted by adjusting the value of the first voltage-dividing resistor 54 and the second voltage-dividing resistor 55. Based on this, the reference voltage may be adjusted with a value larger than the low threshold value VL. As a result, in contrast to the rotation-switching unit 2 in the first and second embodiments, the capacitance of the capacitor 52 in the fourth embodiment may be reduced while maintaining the same length of the time period T1, thereby reducing the cost of the proposed fan system.

Furthermore, the rotation-switching unit 5 of the fourth embodiment may be operated without the diode 53 so as to reduce the cost and simplify the circuitry complexity.

In the first to fourth embodiments above, the charged voltage of the capacitors serves as the rotation control command for controlling the rotation of the motor 6. Alternatively, a discharged voltage may also serve as the rotation control command for controlling the rotation of the motor 6.

Figure 7:
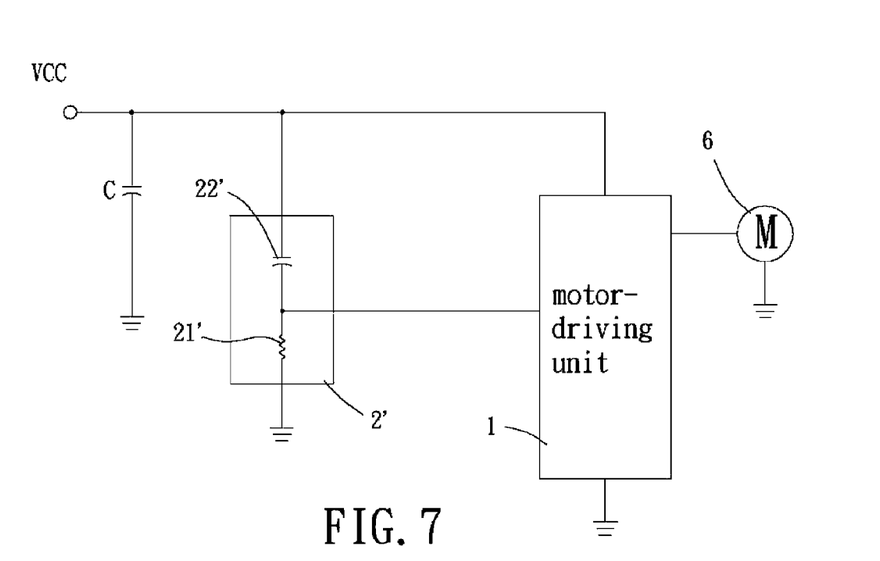
FIG. 7 shows a rotation control circuit of a fan according to a fifth embodiment of the invention.

FIG. 7 shows a rotation control circuit of a fan according to a fifth embodiment of the invention. In contrast to the first embodiment, a rotation-switching unit 2' in the embodiment comprises a resistor 21' and a capacitor 22' forming the charging-discharging circuit, in which the resistor 21' is connected to the motor-driving unit 1 in parallel. The discharging operation of the charging-discharging circuit may be regarded as logic-high signal and logic-low signals to be received by the motor-driving unit 1.

Figure 8:
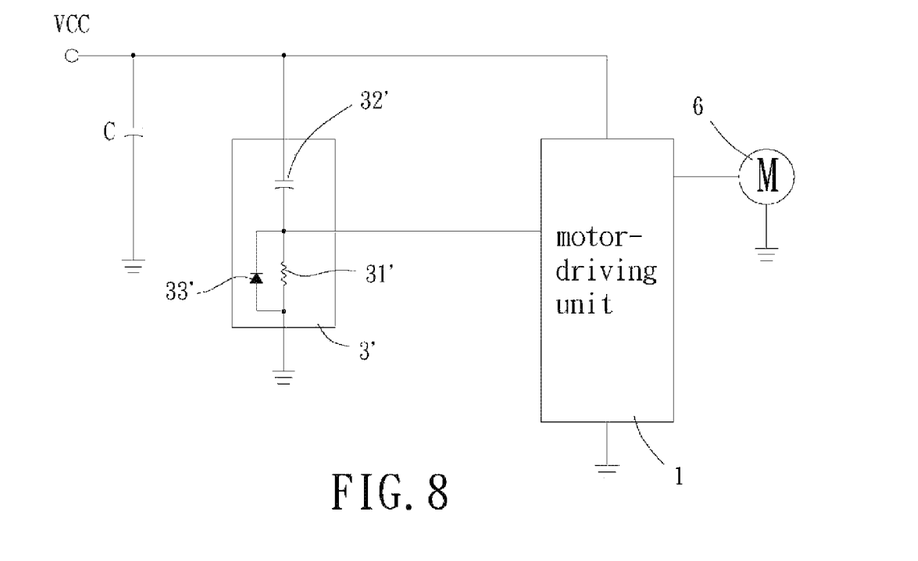
FIG. 8 shows a rotation control circuit of a fan according to a sixth embodiment of the invention.

FIG. 8 shows a rotation control circuit of a fan according to a sixth embodiment of the invention. In contrast to the second embodiment, a rotation-switching unit 3' in the embodiment comprises a resistor 31', a capacitor 32' and a diode 33', with the diode 33' connected to the resistor 31' in parallel. The resistor 31' and the capacitor 32' form the charging-discharging circuit. A cathode of the diode 33' is connected to an output end of the charging-discharging circuit. The discharging operation of the charging-discharging circuit may be regarded as logic-high signal and logic-low signals to be received by the motor-driving unit 1.

Figure 9:
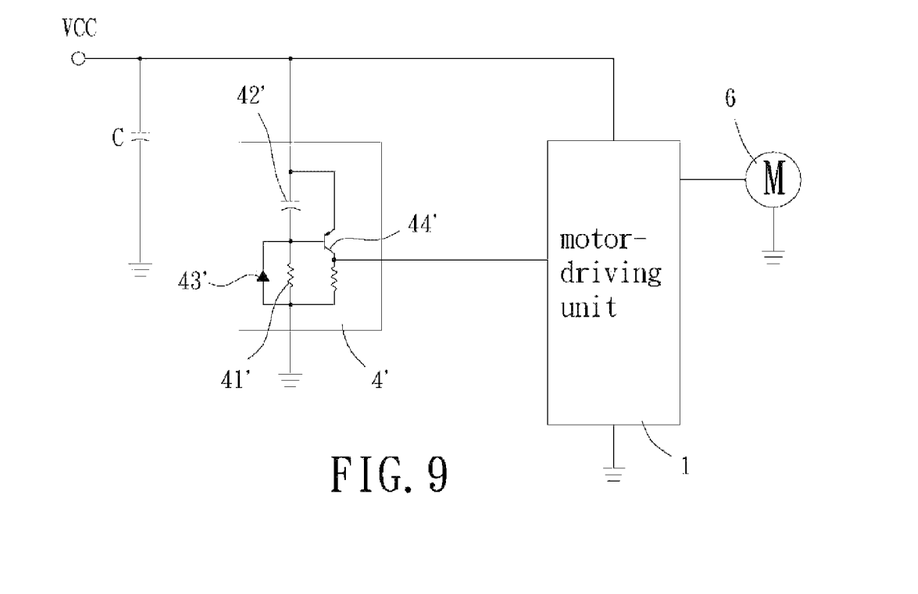
FIG. 9 shows a rotation control circuit of a fan according to a seventh embodiment of the invention.

FIG. 9 shows a rotation control circuit of a fan according to a seventh embodiment of the invention. In contrast to the third embodiment, a rotation-switching unit 4' in the seventh embodiment comprises a resistor 41', a capacitor 42', a diode 43' and a transistor switch 44'. An input end of the transistor switch 44' is electrically connected to a node where the resistor 41' and the capacitor 42' are connected. In this way, the discharged voltage across the resistor 41' may control the switching operation of the transistor switch 44'. The transistor switch 44' may be a P-type transistor, such as a PNP transistor or PMOS transistor.

Figure 10:
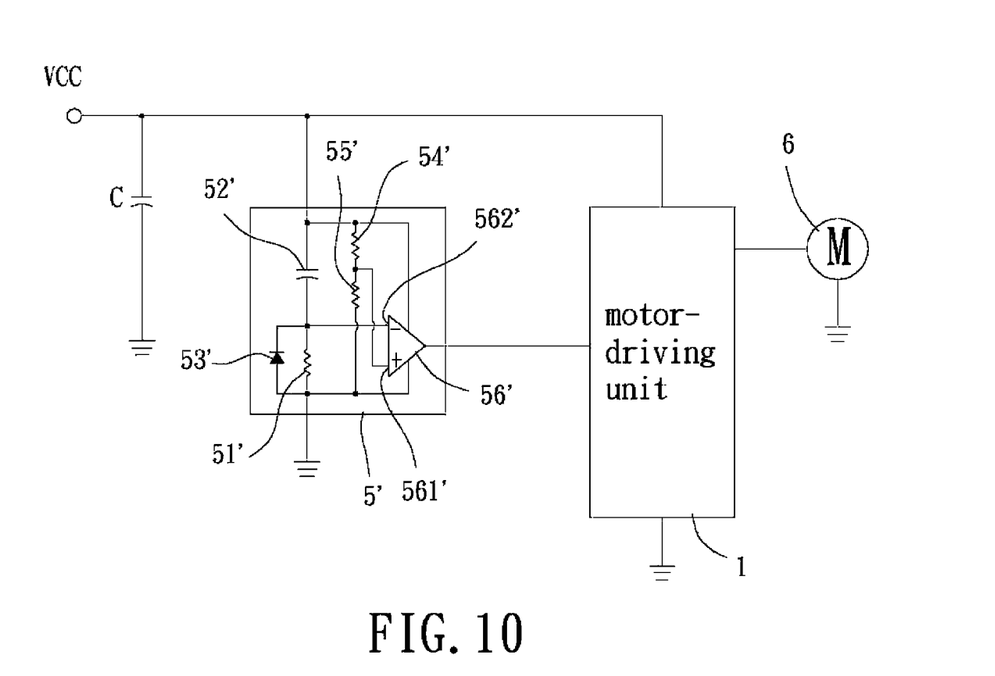
FIG. 10 shows a rotation control circuit of a fan according to an eighth embodiment of the invention.

FIG. 10 shows a rotation control circuit of a fan according to an eighth embodiment of the invention. In contrast to the fourth embodiment, a rotation-switching unit 5' in the embodiment comprises a resistor 51', a capacitor 52', a diode 53', a first voltage-dividing resistor 54', a second voltage-dividing resistor 55' and a comparator 56'. An output end where the resistor 51' and the capacitor 52' are connected is connected to an inverting input 562' of the comparator 56', and another output end where the first voltage-dividing resistor 54' and the second voltage-dividing resistor 55' are connected is connected to a non-inverting input 561' of the comparator 56'. In this way, the motor-driving unit 1 may control the rotation of the motor 6 based on the discharged voltage across the resistor 51'. The comparator 56' has an output end electrically connected to the motor-driving unit 1.

In summary, any of the rotation-switching units 2, 2', 3, 3', 4, 4', 5 and 5' of the invention is able to generate the rotation control command based on only a few analog components for controlling the motor 6 to rotate in the forward direction for a time period and then to rotate in an opposite backward direction after the time period. Based on the design, the invention has achieved the cost reduction compared to the traditional rotation-switching unit, as the traditional rotation-switching unit requires the utilization of the high-cost micro controller 92 for controlling the rotation of the motor 8.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A rotation control circuit, comprising:
a motor-driving unit coupled to a motor of a fan; and
a rotation-switching unit coupled to the motor-driving unit and having at least a charging-discharging circuit for generating a rotation control command, the rotation control command controls the motor to rotate in a forward direction for a time period when the motor starts to operate, and controls the motor to rotate in a backward direction opposite to the forward direction,
wherein the rotation-switching unit comprises a resistor and a capacitor connected in series to form the charging-discharging circuit, and a node where the resistor and the capacitor are connected is an output end coupled to the motor-driving unit,
wherein the capacitor is connected to the motor-driving unit in parallel.

2. The rotation control circuit as claimed in claim 1, wherein the rotation-switching unit further comprises a transistor switch coupled to the output end.

3. The rotation control circuit as claimed in claim 2, wherein the transistor switch has an output end coupled to the motor-driving unit.

4. The rotation control circuit as claimed in claim 2, wherein the transistor switch is an N-type transistor.

5. The rotation control circuit as claimed in claim 2, wherein the transistor switch is a P-type transistor.

6. A rotation control circuit comprising:
a motor-driving unit coupled to a motor of a fan; and
a rotation-switching unit coupled to the motor-driving unit and having at least a charging-discharging circuit for generating a rotation control command, the rotation control command controls the motor to rotate in a forward direction for a time period when the motor starts to operate, and controls the motor to rotate in a backward direction opposite to the forward direction, wherein the rotation-switching unit comprises a resistor and a capacitor connected in series to form the charging-discharging circuit, and a node where the resistor and the capacitor are connected is an output end coupled to the motor-driving unit, wherein the rotation-switching unit further comprises a diode inversely connected to the resistor in parallel.

7. The rotation control circuit as claimed in claim 6, wherein the rotation-switching unit further comprises a transistor switch coupled to the output end.

8. The rotation control circuit as claimed in claim 7, wherein the transistor switch has an output end coupled to the motor-driving unit.

9. The rotation control circuit as claimed in claim 7, wherein the transistor switch is an N-type transistor.

10. The rotation control circuit as claimed in claim 7, wherein the transistor switch is a P-type transistor.

11. The rotation control circuit as claimed in claim 6, wherein the rotation-switching unit further comprises a comparator having an inverting input, a non-inverting input and an output end, the rotation-switching unit further comprises a first voltage-dividing resistor and a second voltage-dividing resistor connected in series to form a voltage-dividing network, the voltage-dividing network has an output end coupled to the inverting input, the output end where the resistor and the capacitor are connected is coupled to the non-inverting input, and the output end of the comparator is connected to the motor-driving unit.

12. The rotation control circuit as claimed in claim 11, wherein the voltage-dividing network is coupled between a power supply and a ground end.

13. The rotation control circuit as claimed in claim 6, wherein the rotation-switching unit further comprises a comparator having an inverting input, a non-inverting input and an output end, the rotation-switching unit further comprises a first voltage-dividing resistor and a second voltage-dividing resistor connected in series to form a voltage-dividing network, the voltage-dividing network has an output end coupled to the non-inverting input, the output end where the resistor and the capacitor are connected is coupled to the inverting input, and the output end of the comparator is connected to the motor-driving unit.

14. The rotation control circuit as claimed in claim 13, wherein the voltage-dividing network is coupled between a power supply and a ground end.

15. A rotation control circuit comprising:
a motor-driving unit coupled to a motor of a fan; and
a rotation-switch unit coupled to the motor-driving and having at least a charging-discharging circuit for generating a rotation control command, the rotation control command controls the motor to rotate in a forward direction for a time period when the motor starts to operate, and controls the motor to rotate in a backward direction opposite to the forward direction,
wherein the rotation-switching unit comprises a resistor and a capacitor connected in series to form the charging-discharging circuit, and a node where the resistor and the capacitor are connected is an output end coupled to the motor-driving unit,
wherein the rotation-switching unit further comprises a comparator having an inverting input, a non-inverting input and an output end, the rotation-switching unit further comprises a first voltage-dividing resistor and a second voltage-dividing resistor connected in series to form a voltage-dividing network, the voltage-dividing network has an output end coupled to the inverting input, the output end where the resistor and the capacitor are connected is coupled to the non-inverting input, and the output end of the comparator is connected to the motor-driving unit.

16. The rotation control circuit as claimed in claim 15, wherein the voltage-dividing network is coupled between a power supply and a ground end.

17. A rotation control circuit,
a motor-driving unit coupled to a motor of a fan; and
a rotation-switching unit coupled to the motor-driving unit and having at least a charging-discharging circuit for generating a rotation control command, the rotation control command controls the motor to rotate in a forward direction for a time period when the motor starts to operate, and controls the motor to rotate in a backward direction opposite to the forward direction,
wherein the rotation-switching unit comprises a resistor and a capacitor connected in series to form the charging-discharging circuit, and a node where the resistor and the capacitor are connected is an output end coupled to the motor-driving unit,
wherein the resistor is coupled to the motor-driving unit in parallel.

18. A rotation control circuit,
a motor-driving unit coupled to a motor of a fan; and
a rotation-switching unit coupled to the motor-driving unit and having at least a charging-discharging circuit for generating a rotation control command, the rotation control command controls the motor to rotate in a forward direction for a time period when the motor starts to operate, and controls the motor to rotate in a backward direction opposite to the forward direction,
wherein the rotation-switching unit comprises a resistor and a capacitor connected in series to form the charging-discharging circuit, and a node where the resistor and the capacitor are connected is an output end coupled to the motor-driving unit,
wherein the rotation-switching unit further comprises a comparator having an inverting input, a non-inverting input and an output end, the rotation-switching unit further comprises a first voltage-dividing resistor and a second voltage-dividing resistor connected in series to form a voltage-dividing network, the voltage-dividing network has an output end coupled to the non-inverting input, the output end where the resistor and the capacitor are connected is coupled to the inverting input, and the output end of the comparator is connected to the motor-driving unit.

19. The rotation control circuit as claimed in claim 18, wherein the voltage-dividing network is coupled between a power supply and a ground end.

* * * * *